June 5, 1956

C. G. FRITSCHI, JR 2,748,996

FERTILIZER AND SEED DISTRIBUTOR

Filed July 12, 1954

INVENTOR
CASPER G. FRITSCHI JR.

BY
*Morris & Wright*

ATTORNEYS

United States Patent Office 2,748,996
Patented June 5, 1956

2,748,996

FERTILIZER AND SEED DISTRIBUTOR

Casper G. Fritschi, Jr., Milwaukee, Wis.

Application July 12, 1954, Serial No. 442,713

3 Claims. (Cl. 222—465)

This invention appertains to garden implements and more particularly to a novel device for distributing fertilizer or seeds over small areas such as home flower and vegetable gardens.

One of the primary objects of my invention is to provide a hand implement for distributing fertilizer or seeds as the case may be, embodying an upright cylindrical casing or hopper for the fertilizer or seeds carrying at its upper end a forwardly extending handle and manipulating hand grip, and a distributing plate at its lower end, the entire device being carried in a depending position from the hand over the bed, the material being distributed evenly over the bed by the mere shaking and twisting of the hand, whereby the use of moving parts is eliminated.

Another salient object of my invention is the provision of a funnel shaped member disposed in the lower end of the hopper above the distributor plate, so that the major portion and weight of the material being distributed is carried above the distributor plate and thereby preventing the packing of the material on the distributing plate.

A further object of my invention is the provision of a perforated distributor plate in the nature of a cap for closing the lower end of the hopper, with shiftable means for varying the size of the perforations in the plate according to the character of the material being dispensed.

A further important object of my invention is the provision of a removable cap for closing the upper end of the hopper, the cap rigidly carrying the handle and manipulating hand grip, the arrangement being such that the handle and grip function to facilitate the placing and removing of the cap on and off of the hopper.

A still further object of my invention is to provide a hand implement of the above character, which will be durable and efficient in use, one that will be simple and easy to manufacture and one which can be placed upon the market at a reasonable cost.

Figure 1:
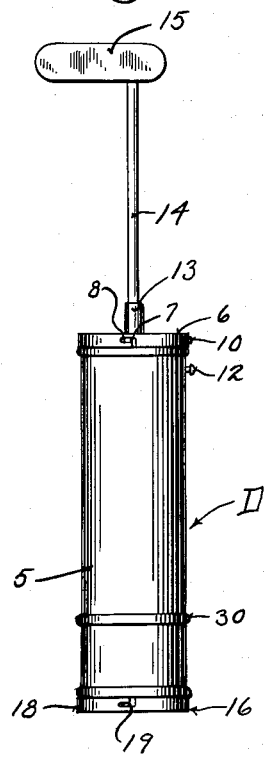
Figure 2:
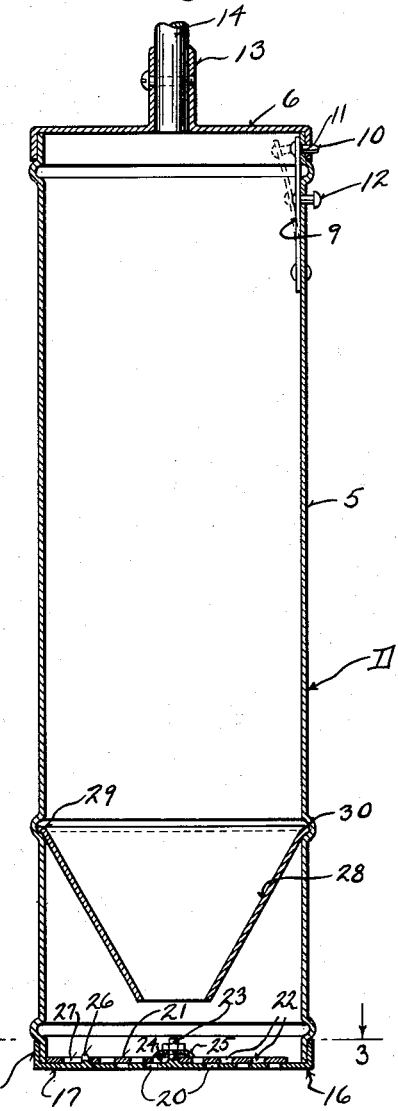
Figure 3:
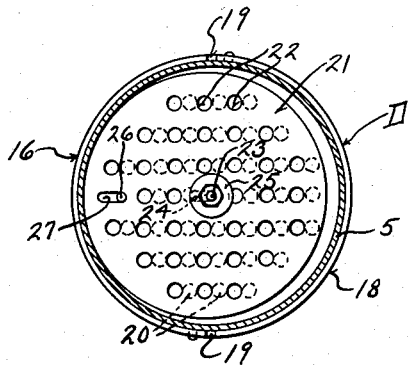

With these and other objects in view, the invention consists in the novel construction, arrangement and formation of parts, as will be hereinafter more specifically described and claimed, and illustrated in the accompanying drawing, in which drawing, Figure 1 is a side elevational view of my improved device;

Figure 2 is a central longitudinal sectional view through the casing or hopper of the device, the view being taken on a larger scale than Figure 1, and Figure 3 is a horizontal sectional view taken on the line 3—3 of Figure 2, looking in the direction of the arrows and showing the arrangement of the adjustable plate for varying the size of the openings in the distributor plate.

Referring to the drawing in detail, wherein similar reference characters designate corresponding parts throughout the several views, the letter D generally indicates my improved device for distributing fertilizer, seed or the like over small areas and the same includes an elongated cylindrical shell 5 which forms a hopper for the material to be dispensed. The material is preferably placed in the upper end of the hopper and this upper end is closed by a freely removable cap 6. The cap 6 can be detachably held in place by the use of bayonet slots 7 formed in the rim of the cap and these bayonet slots receive pins 8 projecting radially from the upper end of the shell. Obviously, by turning the cap, the same can be placed on and off the shell. In view of the fact that the material is dispensed by a shaking and twisting motion, as will later appear, accidental turning movement of the cap can be prevented, such as by the use of a spring latch 9. The latch 9 carries at its upper end a pin 10 which is adapted to project through openings 11 formed in the shell 5 and the rim of the cap when the openings are in alignment. The pin 10 can be conveniently pulled out of the openings by the use of a finger button 12 secured to the latch and this finger button slidably extends through the wall of the shell. The central portion of the cap 6 carries a ferrule 13 and this ferrule has rigidly secured therein an upwardly extending handle 14. Secured to the upper end of the handle 14 is a laterally extending hand grip 15.

The lower end of the cylindrical shell is normally closed by a removable bottom cap 16 and this cap 16 includes a flat bottom plate 17 and an annular rim 18 which fits over the lower end of the shell. The cap is detachably connected to the shell by a bayonet slot connection 19. The plate 17 functions as a distributor plate and the same is provided with rows of outlet openings 20. The active size of these openings 20 can be controlled by a shutter plate 21 slidably carried by the inner face of the plate 17. This shutter plate 21 is provided with rows of openings 22 which correspond to the openings 20 and by shifting the shutter plate 21, the openings 22 therein can be moved into and out of registration or partial registration with the openings 20. In order to guide the shutter plate 21, the axial center of the plate 17 has connected therewith an inwardly extending threaded stud 23 and this stud extends through a central slot 24. A resilient washer 25 is placed on the stud and is held down in frictional contact with the shutter plate by a suitable nut threaded on the stud. In order to hold the shutter plate against turning movement, the plate 17 is provided with a guide lug 26 which extends through a slot 27 in the shutter plate. The slot 27 is in radial alignment with the slot 24. By removing the cap 16 the shutter plate 21 can be shifted to its desired position by the fingers.

In order to relieve the major portion of the weight of the material in the hopper from the distributor plate 17, so as to prevent the packing of the material thereon, disposed in the shell 5 above the distributor plate 17 is a supporting funnel 28. The upper end of the funnel is provided with an annular rim 29. This rim is sprung into an annular bead 30 struck out from the cylindrical shell. I lay great stress on the arrangement of this funnel and I have found that by the use thereof the clogging of material on the distributor plate is prevented.

In use of my device, the desired material is poured into the hopper through the upper end thereof after which the hopper is closed by the top cap 16. The hand grip 15 is now grasped by the user and the hopper is held straight down over the ground. By shaking the hopper and giving the same an oscillatory motion, the material in the hopper will be effectively dispensed over the desired area.

From the foregoing descritpion, it can be seen that I have provided an exceptionally simple but effective device for distributing seeds over a bed or desired fertilizing matter.

Changes in details may be made without departing from the spirit or the scope of this invention, but what I claim as new is:

1. A hand implement for distributing fertilizer, seeds and the like over a garden bed of the type having an elongated cylindrical shell, a removable cap carried by the upper end of the shell, releasable means holding the cap on the shell against accidental movement, an upwardly extending handle on the cap and a manipulating hand grip secured to the handle, comprising a removable bottom cap connected with the shell including a bottom plate having a plurality of outlet openings therein, said shell having a struck out bead therein above the cap, and a funnel having a rim sprung in the bead, said funnel having its outlet arranged in slightly spaced relation to the cap.

2. A hand implement as defined in claim 1, and means for varying the size of the openings.

3. A hand implement as defined in claim 1, and means for varying the size of the openings including a shutter plate slidably carried by the inner surface of the first mentioned plate, said shutter plate having openings therein corresponding to the openings in the first plate, and means slidably supporting the shutter plate on said first plate.

References Cited in the file of this patent

UNITED STATES PATENTS

| | | |
|---|---|---|
| 46,515 | Wiltsie | Feb. 21, 1865 |
| 226,730 | Eddy | Apr. 20, 1880 |
| 1,002,531 | Levy | Sept. 5, 1911 |
| 1,226,722 | Sullivan | May 22, 1917 |
| 1,558,396 | Roehrs | Oct. 20, 1925 |
| 2,535,845 | Fink | Dec. 26, 1950 |